US011674410B2

(12) United States Patent
Kobielski et al.

(10) Patent No.: US 11,674,410 B2
(45) Date of Patent: *Jun. 13, 2023

(54) METHOD AND SYSTEMS FOR A FLUIDIC VARIABLE TURBOCHARGER FOR AN ENGINE

(71) Applicant: Transportation IP Holdings, LLC, Norwalk, CT (US)

(72) Inventors: Louis Kobielski, Sherman, NY (US); Baris Uygun, Erie, PA (US); Adam Felton, Grove City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,128

(22) Filed: Jun. 11, 2021

(65) Prior Publication Data

US 2021/0301715 A1 Sep. 30, 2021

Related U.S. Application Data

(63) Continuation of application No. PCT/US2019/066400, filed on Dec. 13, 2019.

(51) Int. Cl.
*F01D 17/16* (2006.01)
*F02B 37/24* (2006.01)
(Continued)

(52) U.S. Cl.
CPC .............. *F01D 17/167* (2013.01); *B61C 5/04* (2013.01); *F01D 5/147* (2013.01); *F01D 5/148* (2013.01);
(Continued)

(58) Field of Classification Search
CPC ...... F01D 17/167; F01D 5/148; F01D 17/165; F01D 17/16; F02B 37/24; F02B 37/12;
(Continued)

(56) References Cited

U.S. PATENT DOCUMENTS 2,447,292 A 8/1948 Van Acker
4,297,077 A 10/1981 Durgin et al.
(Continued)

FOREIGN PATENT DOCUMENTS

CN 101050722 A * 10/2007 .............. F02B 37/24
DE 102016003701 A1 8/2016
(Continued)

OTHER PUBLICATIONS

ISA Korean Intellectual Property Office, International Search Report and Written Opinion Issued in Application No. PCT/US2019/066400, dated Apr. 13, 2020, WIPO, 16 pages.

*Primary Examiner* — J. Todd Newton
(74) *Attorney, Agent, or Firm* — McCoy Russell LLP

(57) ABSTRACT

Various methods and systems are provided for a fluidic variable turbine. In one example, a system for an engine comprises a turbocharger turbine including a nozzle ring, the nozzle ring including a plurality of stationary vanes, each vane of the plurality of stationary vanes including a plurality of injection ports arranged at an outer surface of the vane, and a gas supply system to supply variable gas flow to and out of the plurality of injection ports.

20 Claims, 9 Drawing Sheets

(51) Int. Cl.
    *F01D 5/14*     (2006.01)
    *B61C 5/04*     (2006.01)
    *F02C 6/12*     (2006.01)

(52) U.S. Cl.
    CPC ............ *F01D 17/165* (2013.01); *F02B 37/24* (2013.01); *F02C 6/12* (2013.01); *F05D 2220/40* (2013.01); *F05D 2240/128* (2013.01); *F05D 2240/30* (2013.01); *F05D 2250/141* (2013.01)

(58) Field of Classification Search
    CPC .. F02C 6/12; F05D 2220/40; F05D 2240/128; F05D 2240/30; F05D 2250/141; B61C 5/04
    USPC .......................................................... 415/151
    See application file for complete search history.

(56) References Cited

U.S. PATENT DOCUMENTS

| | | | |
|---|---|---|---|
| 4,624,104 A * | 11/1986 | Stroem | F01D 5/148 415/115 |
| 4,674,275 A * | 6/1987 | Stroem | F01D 17/14 60/773 |
| 5,489,155 A | 2/1996 | Ide | |
| 5,528,902 A | 6/1996 | Hoerl et al. | |
| 5,704,759 A | 1/1998 | Draskovich et al. | |
| 5,879,085 A | 3/1999 | Ball et al. | |
| 6,913,440 B2 | 7/2005 | Ciacci et al. | |
| 6,997,676 B2 * | 2/2006 | Koshoffer | F01D 5/146 415/115 |
| 8,197,209 B2 * | 6/2012 | Wagner | F02C 9/18 415/914 |
| 9,903,207 B2 | 2/2018 | Tozzi et al. | |
| 10,047,627 B2 | 8/2018 | Malone et al. | |
| 2002/0069845 A1 * | 6/2002 | Heyes | F02B 37/18 123/90.15 |
| 2003/0054196 A1 | 3/2003 | Lau et al. | |
| 2009/0155044 A1 | 6/2009 | Xie et al. | |
| 2011/0008158 A1 | 1/2011 | Boening et al. | |
| 2012/0003086 A1 | 1/2012 | Morris et al. | |
| 2014/0133970 A1 | 5/2014 | Groves | |
| 2014/0140834 A1 | 5/2014 | Richner et al. | |
| 2014/0163445 A1 | 6/2014 | Pallari et al. | |
| 2015/0184516 A1 | 7/2015 | Zhang et al. | |
| 2015/0196971 A1 | 7/2015 | Schneider et al. | |
| 2015/0322850 A1 | 11/2015 | Vardhana et al. | |
| 2015/0345376 A1 | 12/2015 | Ibaraki et al. | |
| 2016/0023272 A1 | 1/2016 | Mongillo, Jr. et al. | |
| 2016/0290164 A1 | 10/2016 | Liebl et al. | |
| 2016/0346997 A1 | 12/2016 | Lewis et al. | |
| 2018/0283288 A1 | 10/2018 | Ishii et al. | |
| 2020/0191012 A1 * | 6/2020 | Kobielski | F01D 17/16 |

FOREIGN PATENT DOCUMENTS

| | | | |
|---|---|---|---|
| GB | 2044860 A * | 10/1980 | ............ F01D 17/143 |
| GB | 2106191 A * | 4/1983 | .............. F01D 17/14 |
| JP | 3758050 B2 * | 3/2006 | ............ F04D 27/023 |
| JP | 5596709 B2 | 9/2014 | |
| WO | WO-2008125554 A1 * | 10/2008 | ............. F01D 17/14 |
| WO | 2010095983 A1 | 8/2010 | |

* cited by examiner

METHOD AND SYSTEMS FOR A FLUIDIC VARIABLE TURBOCHARGER FOR AN ENGINE

CROSS REFERENCE TO RELATED APPLICATIONS

The present application is a continuation application of International Application No. PCT/US2019/066400, titled "METHOD AND SYSTEMS FOR A FLUIDIC VARIABLE TURBOCHARGER FOR AN ENGINE," and filed on Dec. 13, 2019. International Application No. PCT/US2019/066400 claims priority to U.S. patent application Ser. No. 16/219,462, titled "METHOD AND SYSTEMS FOR A VARIABLE GEOMETRY TURBOCHAGER FOR A LOCOMOTIVE ENGINE," and filed on Dec. 13, 2018. The entire contents of each of the above-identified applications are hereby incorporated by reference for all purposes.

TECHNICAL FIELD

Embodiments of the subject matter disclosed herein relate to a fluidic variable turbocharger.

DISCUSSION OF ART

Engines, such as those installed on a vehicle, may be equipped with a variable geometry turbocharger, which may allow an effective aspect ratio of the turbocharger to be altered as engine conditions change, for example, from low engine speeds to high engine speeds. Thus, a desired amount of boost may be provided during engine conditions where exhaust gas production is lower.

Vanes and other similar components may be arranged in a nozzle of the turbine to adjust the turbine geometry. The vanes or other adjacent components may be actuated within the turbine to adjust an airflow therein to decrease an effective throat area of the turbine. This may accelerate exhaust gas therein to increase a turbine speed and increase boost.

BRIEF DESCRIPTION

In one embodiment, a system for an engine includes a turbocharger turbine having a nozzle ring. The nozzle ring includes a plurality of stationary vanes. Each vane of the plurality of stationary vanes includes one or more (e.g., a plurality) of injection ports arranged at an outer surface of the vane. The system also includes a gas supply system that is configured to supply variable gas flow to and out of the plurality of injection ports, via passages that extend through the vanes. The ports may be circular shaped, slot shaped, polygonal shaped, etc.

DETAILED DESCRIPTION

The following description relates to embodiments of a system for an engine comprising a turbocharger turbine having a nozzle ring, the nozzle ring including a plurality of stationary vanes, each vane of the plurality of stationary vanes including a plurality of injection ports arranged at an outer surface of the vane, and a gas supply system to supply variable gas flow to and out of the plurality of injection ports. Previous examples of variable geometry turbines have moving components, such as pivotable or slideable vanes, within a nozzle ring of the turbine to adjust a geometry of the turbine. This architecture presents some problems, including maintenance, reliability, and manufacturing difficulties (e.g., the moving parts may become degraded and need replacing and may be more complicated and/or expensive to manufacture). The stationary vanes described herein receive air flow from an air source, such as from a compressor or turbocharger compressor, in order to inject air into a nozzle of the turbine. An amount of air injected via the vanes may adjust a throat area of the turbine, thereby adjusting an output of the turbine. In one example, the amount of air injected via the vanes may be adjusted via adjusting positions of one or more valves of a flow control system arranged outside of the turbine. However, in alternate embodiments, a different type of variable actuator system may be used to adjust the amount of air injected from the vanes into a throat area of the turbine.

Figure 1:
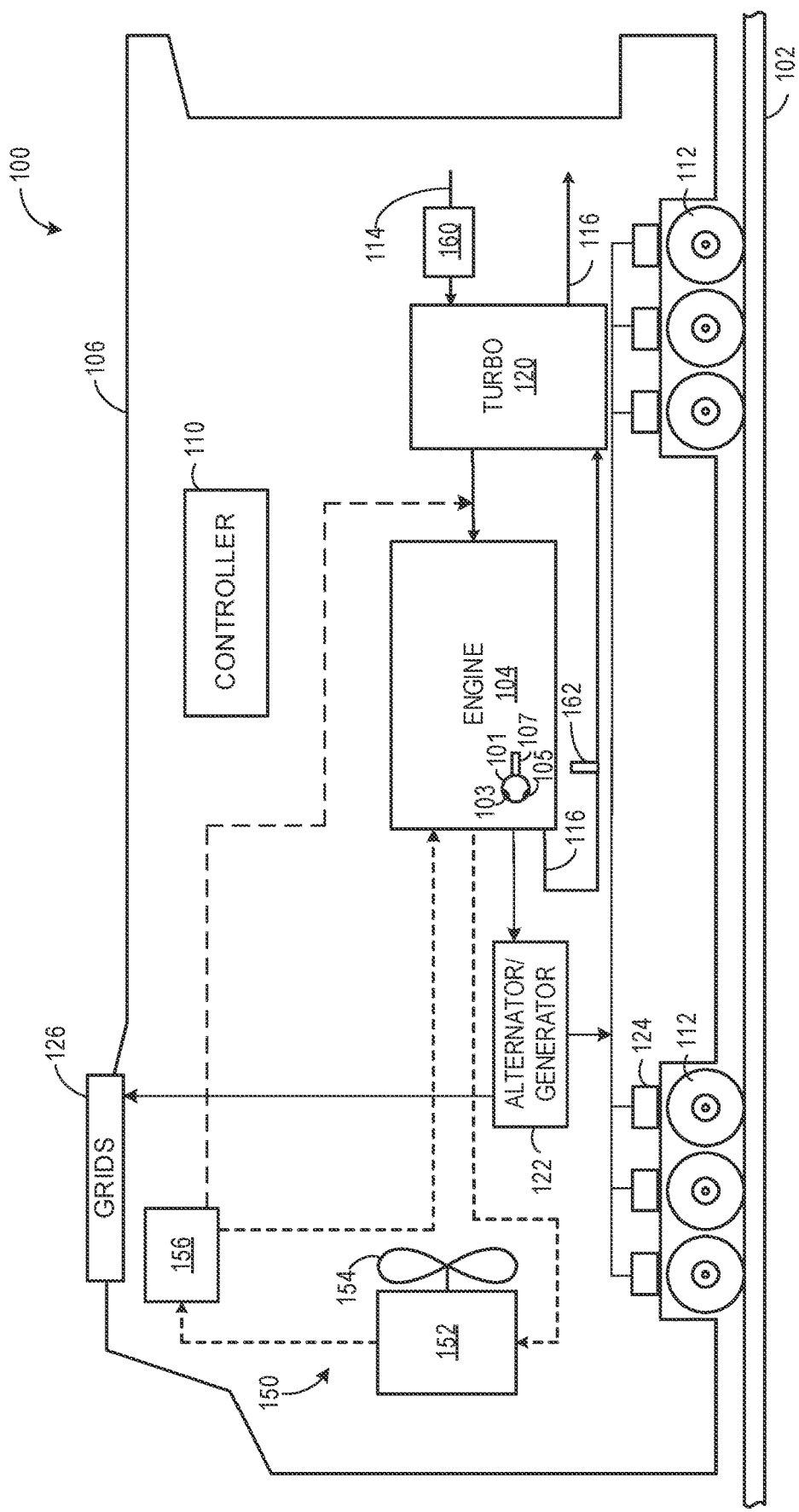
FIG. 1 shows a schematic diagram of a vehicle with an engine comprising a turbocharger arrangement, according to an embodiment of the present disclosure.
Figure 2B:
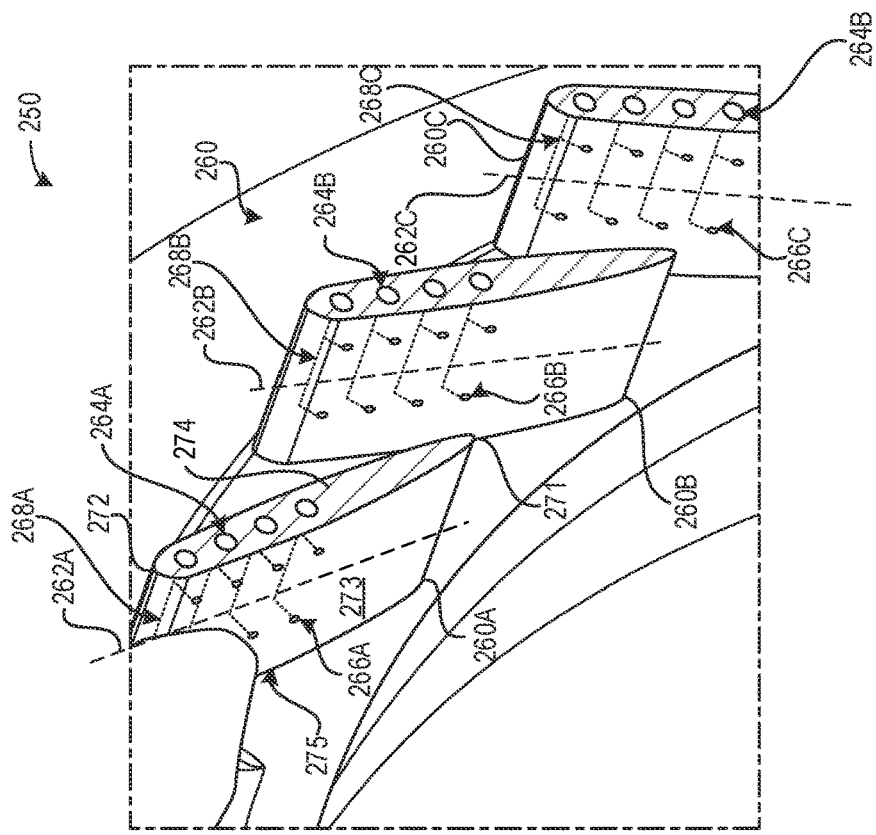
FIGS. 2A and 2B show a first embodiment of a fluidic variable turbine having nozzle vanes adapted to inject air to adjust a throat area of the turbine.
Figure 2A:
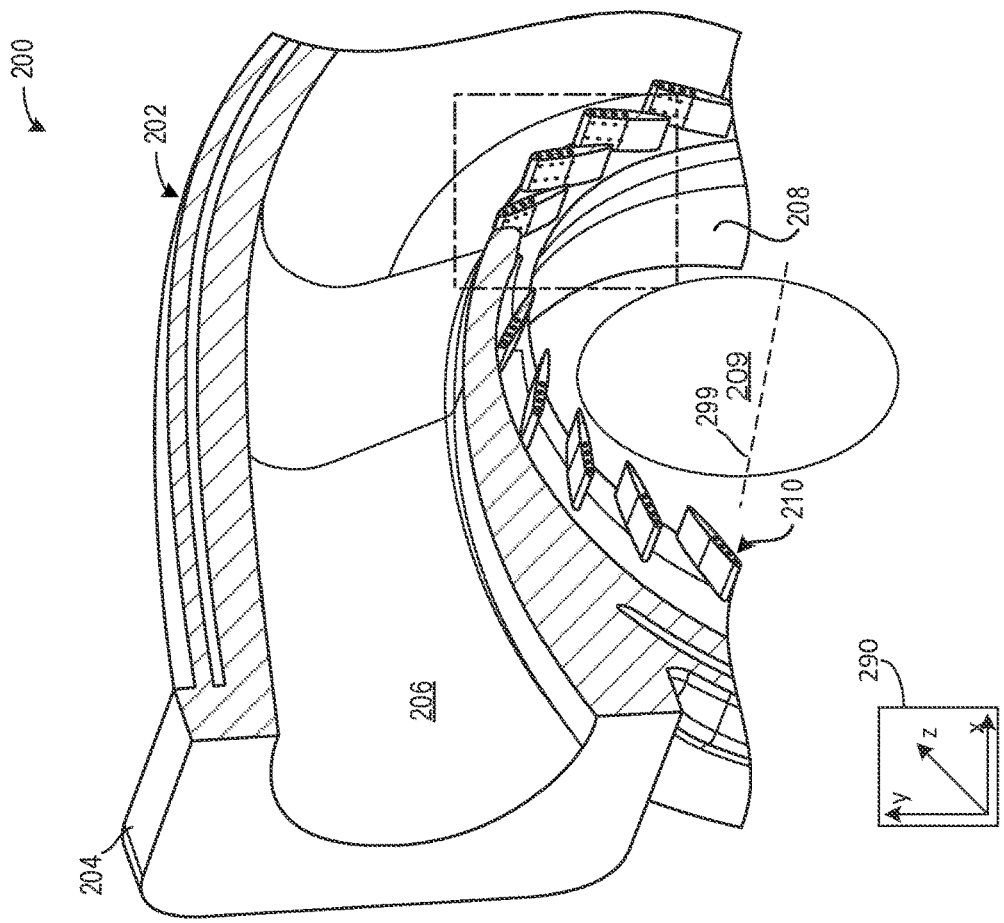
Figure 3:
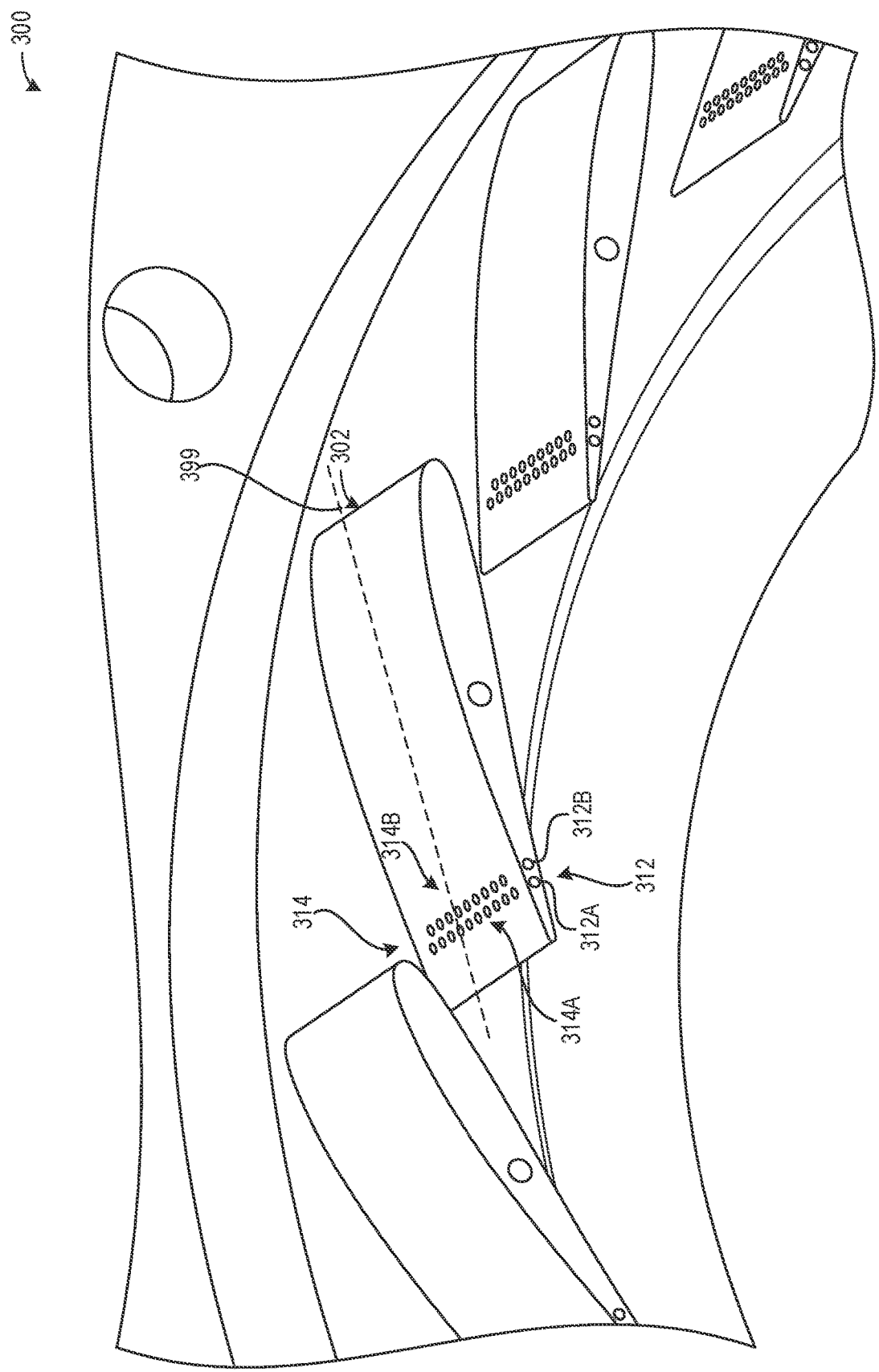
FIG. 3 shows a second embodiment of the fluidic variable turbine having nozzle vanes adapted to inject air to adjust the throat area of the turbine.
Figure 4:
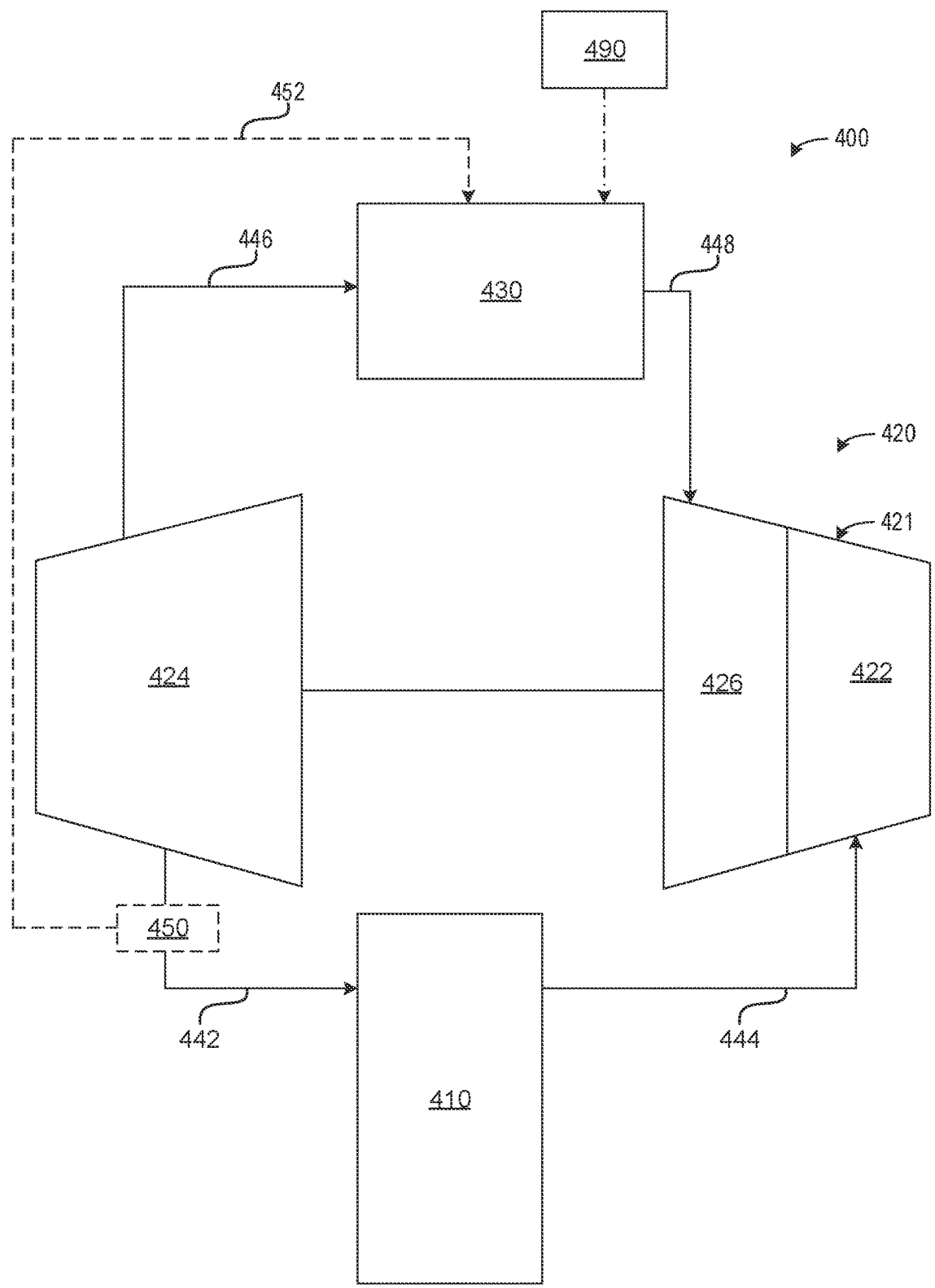
FIG. 4 shows an embodiment of the turbocharger arrangement with a fluidic variable turbine with air injecting nozzle vanes in combination with a flow control arrangement for the nozzle vanes.
Figure 5:
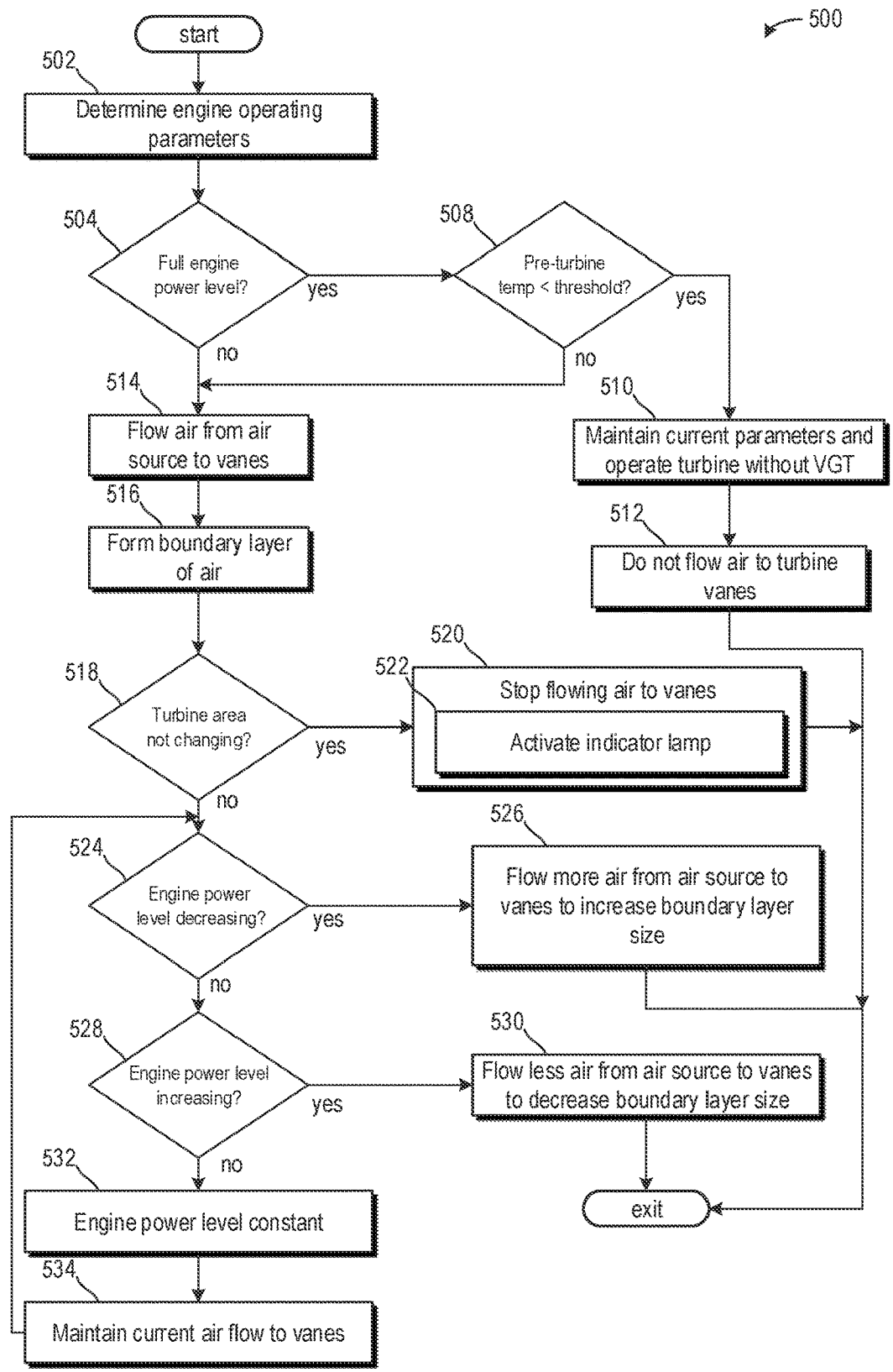
FIG. 5 shows a method for operating a fluidic variable turbine having nozzle vanes adapted to inject air to adjust a throat area of the turbine.
Figure 6:
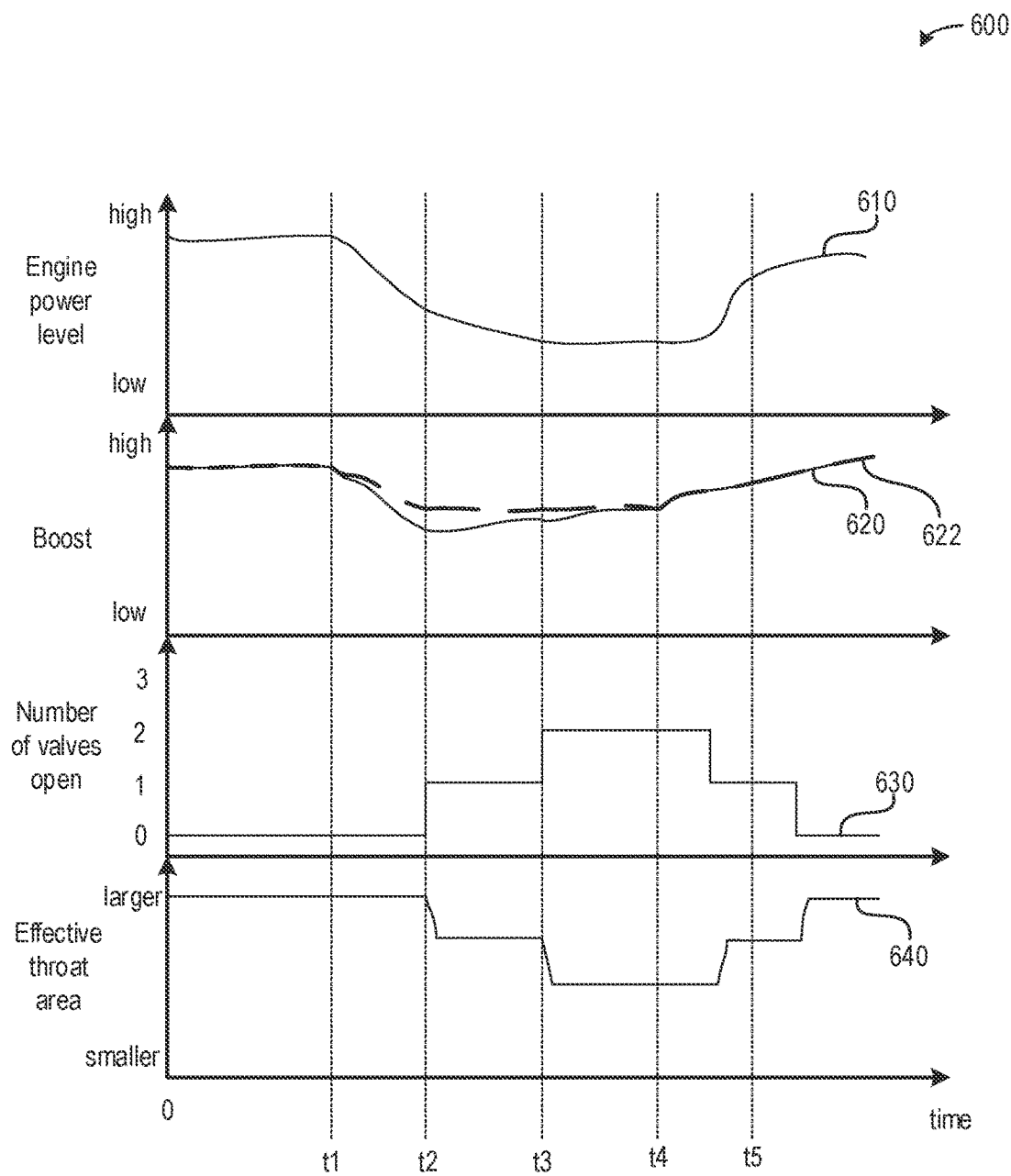
FIG. 6 shows an engine operating sequence for operating a fluidic variable turbine having nozzle vanes adapted to inject air to adjust a throat area of the turbine based on engine operating conditions.
Figure 7A:
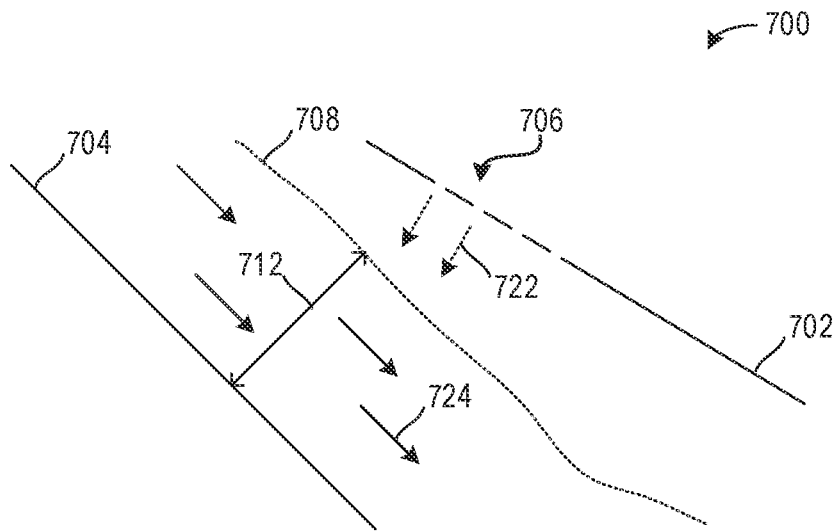
FIGS. 7A and 7B show examples of a smaller boundary layer and a larger boundary layer for adjusting the throat area of the turbine.
Figure 7B:
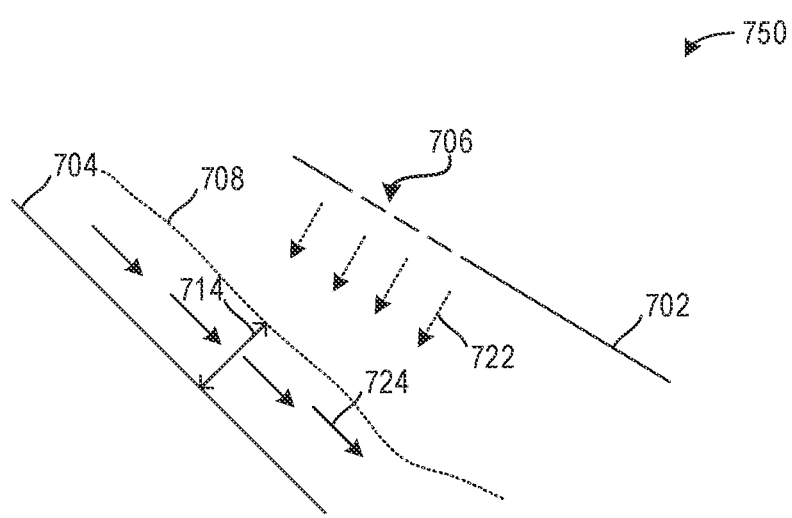
Figure 8A:
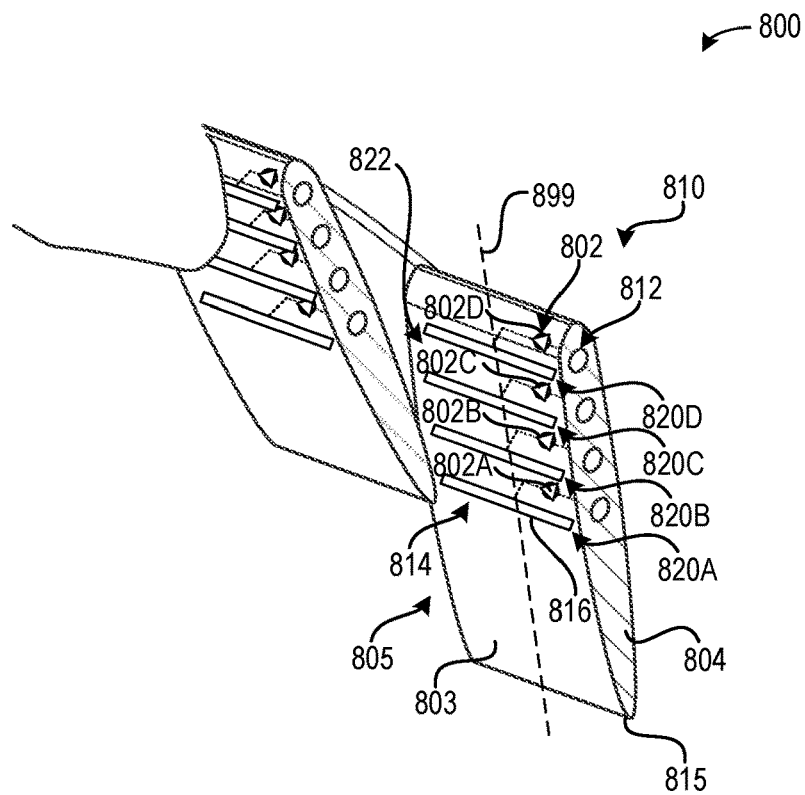
FIGS. 8A, 8B, and 8C show alternative examples of the nozzle vanes.
Figure 8B:
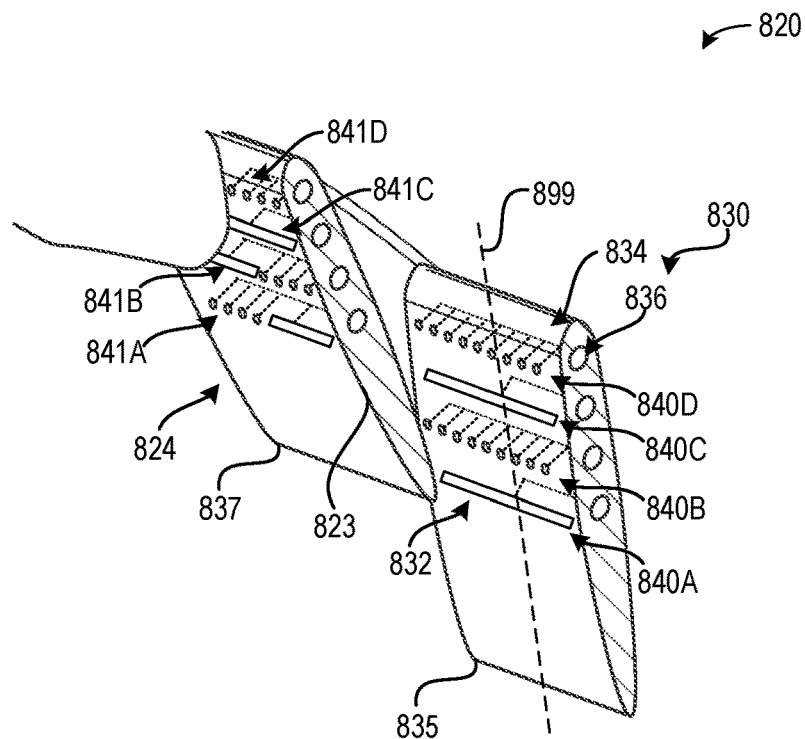
Figure 8C:
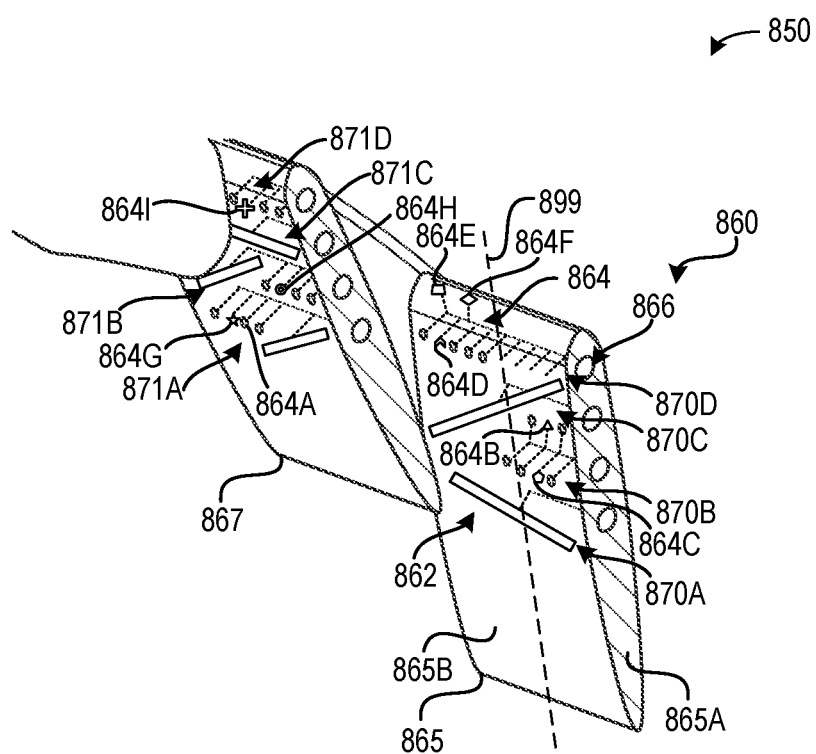

In one example, the turbocharger turbine receives exhaust gas from an engine of a vehicle as shown in FIG. 1. The turbine may comprise a plurality of vanes arranged along a circumference of a turbine nozzle as shown in FIG. 2A. The vanes may comprise a plurality of inlets and interior passages for receiving air from an air source (such as a compressor of the turbocharger) and directing the air to injection ports arranged on an outer surface of the vanes. In one embodiment, the injection ports may be arranged in rows aligned with the inlets and interior passages such that each row is fluidly coupled to one inlet and one interior passage, as shown in FIG. 2B. A flow control system, such as the flow control system shown in FIG. 4, may comprise a set of valves, wherein each valve is configured to adjust air flow to each inlet and interior passage. FIG. 5 shows a method for adjusting an amount of air injected by the turbine nozzle vanes based on an engine condition, such as an engine power level. FIG. 6 shows an engine operating sequence illustrating changes in air supplied to the nozzle vanes based on changing operating conditions of the engine. An alternative embodiment of the vanes is illustrated in FIG. 3. The vanes may produce a boundary layer sized based on an amount of air flowing therethrough. Examples of two differently sized boundary layers are shown in FIGS. 7A and 7B. Further alternative examples of the vanes are illustrated in FIGS. 8A, 8B, and 8C.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the disclosure.

FIGS. 1-3 and 8A-8C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows an embodiment of a system in which a turbocharger arrangement may be installed. Specifically, FIG. 1 shows a block diagram of an embodiment of a vehicle system 100, herein depicted as a vehicle 106. The illustrated vehicle is configured to run on a rail 102 via a plurality of wheels 112. As depicted, the vehicle 106 includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other on- or off-highway vehicle propulsion system as noted above.

The engine receives intake air for combustion from an intake passage 114. The intake passage comprises an air filter 160 that filters air from outside of the vehicle. Exhaust gas resulting from combustion in the engine is supplied to an exhaust passage 116. Exhaust gas flows through the exhaust passage, and out of an exhaust stack of the vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator 122 produces electrical power that may be stored and applied for subsequent propagation to a variety of downstream electrical components. As an example, the alternator/generator 122 may be electrically coupled to a plurality of traction motors and the alternator/generator may provide electrical power to the plurality of traction motors. As depicted, each of the plurality of traction motors is connected to one of the plurality of wheels to provide tractive power to propel the vehicle. One example configuration includes one traction motor per wheel set. As depicted herein, six traction motors correspond to each of six pairs of motive wheels of the vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include at least one compressor (not shown) which is at least partially driven by at least one corresponding turbine (not shown). In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or exhaust aftertreatment systems.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system.

The controller 110 may be configured to control various components related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller may control the engine and/or the vehicle by sending commands to various components such as the traction motors, the alternator/generator, fuel injectors, valves (e.g., coolant and/or EGR cooler valve), coolant pump, or the like. For example, the controller may control the operation of a restrictive element (e.g., such as a valve) in the engine cooling system. Other actuators may be coupled to various locations in the vehicle.

Herein, description is directed to a turbine of a turbocharger, such as turbocharger 120 shown in FIG. 1, which may be a fluidic variable turbine, wherein a throat area of the turbine may be adjusted based on engine conditions. In one example, the engine condition is an engine power level (e.g., notch level) and/or an engine load. As the engine power level decreases, it may be desired to decrease a throat area of the turbine. Previous examples of variable geometry turbines include mechanically movable vanes or stationary vanes with a movable component such as a shroud or other similar device. By moving the vanes or an adjacent component, a throat area of the turbine is adjusted to adjust a speed of airflow through the turbine and increase boost provided by a current level of exhaust gas production.

However, such turbines may have shortcomings. For example, moving components, such as mechanically movable components, arranged in the turbine may be prone to degradation, which may be difficult to access and repair. Additionally, manufacture of such a turbine may be cumbersome as electrical wires are routed through various surfaces of the turbine, which may become hot during engine operation. Thus, the electrical wires may demand a heat resistant coating. The inventors have recognized these problems and have come up with a way to at least partially solve them. By utilizing a plurality of stationary nozzle vanes in a turbine to inject various amounts of air into the turbine nozzle to adjust a throat area of the nozzle through fluidic blocking and by arranging a flow control system outside of the turbine for the stationary nozzle vanes inside of the turbine, the above described issues may be circumvented. For example, such a system may reduce a number of mechanical components within the turbine. Additionally, the nozzle vanes and flow control system described herein may provide a greater degree of control over adjusting the area of the turbine such that a greater range of boost may be achieved.

Turning now to FIG. 2A, it shows a first embodiment 200 of a turbine 202. The turbine may be used in the turbocharger arrangement 120 of FIG. 1. An axis system 290 is shown comprising three axes, namely an x-axis parallel to a horizontal direction, a y-axis parallel to a vertical direction, and a z-axis perpendicular to each of the x- and y-axes. The axes may be used in reference to describe shapes and orientations of components of the turbine.

The turbine comprises a turbine housing 204 which may shape an exhaust gas inlet 206. The exhaust gas inlet 206 may comprise a volute shape adapted to receive exhaust gas from an engine, such as engine 104 of FIG. 1. The volute shape of the exhaust gas inlet may distribute the exhaust gas around in a 360° manner to a turbine wheel (circle 209 indicates where a turbine wheel may be positioned within the turbine). The exhaust gas may rotate the turbine wheel, which may translate into rotation of a compressor wheel in a manner known to those of ordinary skill in the art.

The turbine may further comprise a plurality of vanes 210 arranged adjacent to and surrounding the turbine wheel, around an entire circumference of the turbine wheel, along a nozzle ring 208. Together, the nozzle ring 208 and plurality of vanes 210 may form a nozzle of the turbine (e.g., turbine nozzle), adapted to guide exhaust flow to the turbine wheel. The plurality of vanes may be printed onto the nozzle ring in some examples, e.g., using an additive manufacturing or 3-D printer. Additionally or alternatively, the plurality of vanes may be assembled from a mold. The plurality of vanes may be fixed and stationary. For example, each vane may be stationary and not move (e.g., pivot, rotate, or translate) relative to a body of the nozzle ring (to which they are attached) and a central axis of the turbine wheel. Additionally, the plurality of vanes, inside the turbine, may be free of electrical, mechanical, pneumatic, hydraulic, and other types of actuators. The plurality of vanes may be free of moving parts, such as a sliding wall, slotted shroud, or other devices known by those of ordinary skill in the art to adjust the turbine housing geometry. In one example, the vanes may be fixed relative to the nozzle ring such that when the ring rotates the vanes remain stationary. Additionally or alternatively, the vanes may rotate with a rotation of the nozzle ring, but may not rotate independent of the nozzle ring.

The plurality of vanes may be arranged around an entire circumference of the nozzle ring, between the turbine wheel and the exhaust gas inlet. The plurality of vanes may be shaped to adjust a geometry of the turbine based on one or more engine conditions, such as an engine power level. The plurality of vanes may be shaped to inject air through one or more ports, which may create a boundary layer of air. The boundary layer of air may reduce an effective throat area of the nozzle, which may adjust an operating point of the turbocharger. In one example, the boundary layer of air adjusts a geometry of the turbine housing to accelerate exhaust gas as it flows between the boundary layer and to the turbine blades, making them spin faster than they would otherwise. This may be desired when a current level of exhaust gas production is insufficient (e.g., below a threshold) to meet a current boost demand, such as during a lower engine power level.

Turning now to FIG. 2B, it shows a detailed view 250 of three vanes 260 of the plurality of vanes 210 of FIG. 2A. More specifically, the three vanes include a first vane 260A, a second vane 260B, and a third vane 260C.

The three vanes may each comprise individual central axes, which may also define a long axis of each vane, including a first vane central axis 262A, a second vane central axis 262B, and a third vane central axis 262C. The vanes may be angled relative to one another such that the central axes may be misaligned. In one example, the central axes are not parallel. The angle between each vane of the three vanes may be fixed in one example. In some embodiments, additionally or alternatively, the vanes may each be oriented differently such that an angle between the first and second vanes is different than an angle between the second and third vanes. In either case, the angle between adjacent vanes may not be adjusted due to the vanes being fixed and stationary once arranged on the nozzle ring.

The angle between adjacent vanes may be less than 80 degrees. In some examples, additionally or alternatively, the angle between adjacent vanes is between 5 and 70 degrees. In some examples, additionally or alternatively, the angle between adjacent vanes is between 5 and 60 degrees. In some examples, additionally or alternatively, the angle between adjacent vanes is between 5 and 50 degrees. In some examples, additionally or alternatively, the angle between adjacent vanes is between 5 and 40 degrees. In some examples, additionally or alternatively, the angle between adjacent vanes is between 5 and 30 degrees. In some examples, additionally or alternatively, the angle between adjacent vanes is between 5 and 20 degrees. In some examples, additionally or alternatively, the angle between adjacent vanes is between 10 and 20 degrees. In one example, the angle is 15 degrees. In some examples, the angle may be based on increasing efficiency for a plurality of load points. As such, the angle may be adjusted based on a maximization of efficiency of a desired load point.

The first, second, and third vanes may be substantially identical in size and shape. The first, second, and third vanes may be a single, continuous piece. More specifically, each vane may comprise a first extreme end 271 and a second extreme end 272, wherein a curvature of the second extreme end may be more pronounced than the first extreme end. As such, the first extreme end may be more pointed than the second extreme end. In this way, the vane may narrow as it extends from the second extreme end to the first extreme end.

The first and second extreme ends may be extreme ends of a vane body 273. The vane body 273 may be solid, except for one or more interior air passages arranged therein for the one or more ports as will be described below. The vane body 273 may comprise a first side wall 274 and a second side wall 275. The first side wall may be substantially identical to the second side wall in size and shape, except that the second side wall may be physically coupled to a portion of the turbine 202. The physical coupling may include one or more of bolts, adhesives, welds, and fusions to maintain the vanes stationary position. Each of the first and second side walls may extend from between the first extreme end and the second extreme end. The vane body, including the side walls, may comprise a paddle-like shape. In some examples, additionally or alternatively, the side walls may comprise an elongated teardrop shape.

Each vane may comprise a plurality of inlets, wherein the first vane comprises a first plurality of inlets 264A, the second vane comprises a second plurality of inlets 264B, and the third vane comprises a third plurality of inlets 264C. Each of the plurality of inlets may be arranged along the first side wall of the vanes, facing a direction opposite a turbine blade.

The first plurality of inlets may be shaped and/or configured to flow air to a first plurality of injection ports 266A arranged on an outer surface of the vane body of the first vane. The second plurality of inlets may be shaped and/or configured to flow air to a second plurality of injection ports 266B arranged on an outer surface of the vane body of the second vane. The third plurality of inlets may be shaped and/or configured to flow air to a third plurality of injection ports 266C arranged on an outer surface of the vane body of the third vane. Air may flow from an air source (such as a compressor, as shown in FIG. 4), through a flow control system arranged outside of the turbine, to the inlets, through one or more interior passages, and out the injection ports to form a boundary layer of air. Additionally or alternatively, the air supply may be partially or fully derived from a compressor outlet of the turbocharger to the extent that the desired benefits may be achieved at various operating conditions. The air supply to the turbine vanes may also be supplemented by off engine sources in some applications, such as an auxiliary pump.

The first vane, second vane, and third vane may be substantially identical. As such, the following description with regard to the first plurality of inlets and the first plurality of injection ports of the first vane may also be applied to the inlets and injection ports of the second and third vanes. The first plurality of inlets may be aligned along a common axis and arranged on the first side surface. Each inlet of the first plurality of inlets may comprise a circular shape. However, in alternate embodiments, the inlets may have a different shape, such as square, rectangular, or oblong. Each inlet of the first plurality of inlets may be similarly sized. The first plurality of inlets may receive air from the air source and direct the received air through an interior air passage of the first vane to a plurality of corresponding injection ports. In one example, the interior air passage extends in a direction perpendicular to the common axis and the central axis, wherein the interior passage is fluidly coupled only to injection ports arranged along its path, which may include a row of injection ports. That is to say, an inlet may be fluidly coupled to only one interior passage, and the interior passage may be fluidly coupled only to the injection ports aligned with an axis of the interior passage. Thus, in the example of the first vane, there may be four interior passages, wherein each of the interior passages is fluidly coupled to two injection ports. The interior passages may be machined and/or molded into the vane body. As such, the vane body may be solid except for the interior passages. In this way, fluid (e.g., air) in different interior passages may not mix. In one example, the first vane, excluding the inlets and interior passages but including the injection ports may comprise reflectional symmetry about the central axis. Additionally or alternatively, the first vane, excluding the injection ports but including the inlets and interior passages may comprise reflectional symmetry about the common axis.

More specifically, air from an air source may flow to the first plurality of inlets 264A and to a first plurality of interior passages 268A which are fluidly coupled to the first plurality of injection ports 266A. Air from the air source may flow to the second plurality of inlets 264B and to a second plurality of interior passages 268B which are fluidly coupled to the second plurality of injection ports 266B. Air from the air source may flow to the third plurality of inlets 264C and to a third plurality of interior passage 268C which are fluidly coupled to the second plurality of injection ports 266C.

Each of the interior passages may originate at a single inlet, wherein the interior passage may branch a number of times corresponding to a number of injection ports corresponding to the inlet, wherein the interior passage may terminate at each of the injection ports. In the example of FIG. 2B, there are two injection ports corresponding to each inlet, as such, each interior passage may branch twice from a common passage, wherein each of the two branches terminate at the injection ports. The interior passages of a single, shared vane may be fluidly separated from one another such that gas of a first interior passage does not mix with gas of a second interior passage. Additionally or alternatively, in some examples, the vane may be hollow and serve as a plenum for providing a desired air supply. The internal structure of the vane may comprise a unique geometry which results in a certain state of optimized flow which is presented to the inlet resulting in an increased effectiveness of throat reduction.

Each of the plurality of injection ports may be arranged to inject air in a radially inward direction, angled to a central axis (dashed line 299) of the turbine wheel, perpendicular to a plane of the vane body. This may result in a reduction of a throat area of the nozzle ring. The inlets ports may be arranged on either side of the vane. That is to say, the inlet ports may be arranged on the side shown in FIG. 2B, or on an opposite side, as shown in FIG. 3. Either iteration of inlet ports may be used depending on air flow behavior and desired throat nozzle characteristics. More specifically, a boundary layer of air may be formed as air flows through the pluralities of injection ports and into the nozzle ring. In this way, the boundary layer may decrease the nozzle ring opening via fluidic blocking, which may increase an acceleration of exhaust gas flowing to the turbine blade, which may allow a turbocharger to realize higher amounts of boost. This may be desired at lower engine loads and/or lower engine power, where exhaust gas production may be low and insufficient to provide a desired amount of boost. As described further below, as an amount of air injected by a vane increases, the boundary layer may further increase (e.g., extend in a direction outward from the vane), further decreasing the nozzle throat area and increasing the acceleration of exhaust gas. In some examples, applications may benefit from a variation of the present example, which may mimic a moving wall geometry turbine, which may comprise inlet ports acting on faces perpendicular to a vane face.

The plurality of inlets may be configured such that each inlet corresponds to two or more injection ports of the plurality of injection ports. In the example of FIG. 2B, each inlet of the plurality of inlets corresponds to two injection ports. In one example, the first vane comprises four inlets, wherein each inlet is fluidly coupled to two injection ports. Thus, the first vane comprises eight injection ports divided into four groups and/or rows, where each group is fluidly coupled to a different one of the plurality of inlets. However, in alternate embodiments, there may be different numbers and shapes of injection ports. Another examples of vanes shaped to adjust a throat area of a turbine is shown in FIG. 3.

As will be described below, the flow control system for the vanes may include a valve actuation system, which may include a plurality of valves configured to individually adjust air flow to each of the injection ports arranged within a shared row.

Turning now to FIG. 3, it shows an alternative embodiment 300 of the plurality of vanes 210 illustrated in FIGS. 2A and 2B. More specifically, the alternative embodiment illustrates a different arrangement of a plurality of inlets 312 and a plurality of injection ports 314 of a vane 302. More specifically, a number of the plurality of inlets may be less than a number of the plurality of inlets illustrated in FIG. 2B. In one example, there are only two inlets per vane in the example of FIG. 3, whereas the example of FIG. 2B comprises four inlets per vane.

A first inlet 312A may flow air to a first group and/or a first row of injection ports 314A. A second inlet 312B may flow air to a second group and/or a second row of injection ports 314B. As such, a valve or other similar device of a flow control system may be dedicated to adjusting air flow to only the first inlet and first group and/or first row of injection ports. A second valve of the flow control system may be dedicated to adjusting air flow to only the second inlet and second group and/or second row of injection ports. In one example, the valves are valves of the flow control system illustrated in FIG. 4. The valves may be actuated between fully closed and fully open positions. In this way, opening more valves may increase the amount of air injected from a vane. Additionally or alternatively, the valves may be actuated to positions between fully closed and fully open. In this way, a minimum or no air flow may occur at the fully closed position and a maximum air flow may occur at the fully open position. Thus, positions between the fully open and fully closed positions may provide less than the maximum and greater than the minimum amounts of air flow. In this way, the valves may provide a continuously variable amount of airflow through the injection ports. The valves may be operated independently such that air flow through the first row of injection ports may be different than air flow through the second row of injection ports. For example, the first row of injection ports may flow maximum air flow and the second row of the injection ports may flow air flow corresponding to a partially open position of the second valve. By doing this, rows may be progressively activated (e.g., enabled to flow air into the turbine) as the engine power level decreases to meet a boost demand.

The injection ports of the first group may be misaligned with injection ports of the second group. That is to say, the injection ports of different groups may be misaligned relative to a longitudinal axis, parallel to a central axis 399, of the vane. In one example, a number of injection ports in the first group may be greater than a number of injection ports in the second group. Additionally or alternatively, the numbers may be equal without departing from a scope of the present disclosure. Additionally, though only two rows of injection ports (and two corresponding air inlets) are shown in FIG. 3, in alternate embodiments, additional rows of injection ports (and corresponding air inlets) may be included on the outer surface of each vane. For example, each vane may include three, four, five, or the like, rows of injection ports and a corresponding number of air inlets. By flowing air to an increasing number of the inlets (e.g., via the valve system described below), the nozzle throat area may be progressively decreased.

In the example of FIG. 3, the injection ports are arranged to inject air in a radially outward direction, which may be opposite to a radially inward direction shown in FIG. 2B. At any rate, the injection ports may still generate a boundary layer of air, which may provide a similar throat area reduction as described with respect to FIG. 2B.

Turning now to FIG. 4, it shows an embodiment 400 comprising an engine 410, a turbocharger 420, and a flow control system 430. The engine 410 and turbocharger 420 may be used similarly to engine 104 and turbo 120 of FIG. 1. As shown, the turbocharger 420 comprises a turbine 422 and a compressor 424. The turbine may be used similarly to turbine 202 of FIG. 2A.

Arrow 442 indicates boost air flow from the compressor 424 to the engine 410. As the air is combusted, the engine may expel exhaust gas, shown by arrow 444, to the turbine. Additionally or alternatively, a charge-air cooler 450 may be arranged between the compressor and the engine in a manner known to those of ordinary skill in the art. The charge-air cooler may cool the compressed air from the compressor, which may cool engine components and provide greater engine power output. During some engine operating conditions, it may be desired to decrease a throat area of the turbine to compensate for exhaust gas production being insufficient to meet a boost demand. In order to decrease the throat area of the turbine, a boundary layer of air may be generated via vanes arranged in the nozzle 426 between a turbine wheel 422 and the compressor. The vanes may receive air from an air source via the flow control system 430. In one example, the air source is the compressor 424. In another example, the air source may be the charge-air cooler. The air source may be switched between the compressor and the charge-air cooler based on operating conditions. For example, air flow through the vanes may form a boundary layer and may cool the turbine. If an increased amount of cooling is desired, then the charge-air cooler may be selected as an air source and not the compressor, as shown by arrow 452. However, if cooling is not desired or if less cooling is desired, then the compressor may be selected.

Arrow 446 indicates air flowing from the compressor to the flow control system, where the air flows through at least one partially open valve and to the vanes, as shown by arrow 448. The valve may be commanded open via a signal from a controller 490, which may be used similarly to controller 110 of FIG. 1. The controller may send the signal to an actuator of the valve in response to an engine condition (e.g., engine power level and/or pre-turbine temperature).

More specifically, the plurality of inlets may receive air from the air source when one or more valves of the flow control system are in an at least partially open position. In some examples, the number of valves arranged in the flow control system may be equal to the number of the plurality of inlets. As such, if there are four inlets, then the flow control system may comprise four valves. In some examples, a single valve may adjust air flow to a single inlet of each vane. Continuing with the example above where each vane comprises four inlets, a first valve of the flow control system may adjust air flow to a first inlet of the vanes, a second valve of the flow control system may adjust air flow to a second inlet of the vanes, a third valve of the flow control system may adjust air flow to a third inlet of the vanes, and a fourth valve of the flow control system may adjust air flow to a fourth inlet of the vanes. In this way, if the first valve is in a partially open position and the second, third, and fourth valves are in fully closed positions, then air may flow only through injection ports fluidly coupled to the first inlets of the vanes.

In some embodiments, additionally or alternatively, the flow control system may comprise a single valve controllable to adjust air flow to each of the inlets of the vanes. As such, the single valve may be progressively opened so that each injection port of each vane injects more air, thereby increasing the boundary layer size and decreasing the throat area. Thus, the single valve may also be gradually closed so that each injection port of each vane injects less, thereby decreasing the boundary layer size and increasing the throat area.

In some embodiments, additionally or alternatively, the flow control system may comprise a configuration of valves such that air flow through each vane may be adjusted individually. Thus, if a vane of the plurality of vanes comprises four inlets, then the flow control system may comprise four valves to adjust air flow through each of the inlets of the vane, and the valve system may comprise four valves for each vane.

Additionally or alternatively, the flow control system may comprise a combination of valves for metering air flow from the compressor and charge-air cooler. In some examples, a desired temperature of air may be provided to the vanes by mixing air from the compressor and the charge-air cooler. In this way, a desired amount of cooling may be achieved in the turbine when a pre-turbine temperature is greater than or equal to a threshold. As will be described in the method of FIG. 5, the flow control system may be operated to adjust air flow from the air source(s) to either adjust the turbine temperature or to adjust the throat area of the turbine.

Turning now to FIG. 5, it shows a method 500 for adjusting air flow through the turbine nozzle vanes to adjust a throat area of the turbine nozzle to increase an efficiency of the turbocharger while meeting a boost demand for current engine operating conditions. Instructions for carrying out method 500 may be executed by a controller (e.g., controller 110 shown in FIG. 1 or controller 490 shown in FIG. 4) based on instructions stored on a memory of the controller and in conjunction with signals received from sensors of the engine system, such as the sensors described above with reference to FIG. 1. The controller may employ engine actuators of the engine system to adjust engine operation, according to the methods described below, such as actuators described above with reference to FIG. 4 and in conjunction with the nozzle vanes of the turbocharger, such as the nozzle vanes shown in FIGS. 2 and/or 3.

The method 500 begins at 502, which includes determining, estimating, and/or measuring one or more engine operating parameters. The one or more engine operating parameters may include but are not limited to one or more of an engine speed, engine load, engine power level (e.g., notch level), engine temperature, mass air flow, boost, EGR flow rate, exhaust pressure, and air/fuel ratio.

The method 500 may proceed to 504, which may include determining if an engine power level (e.g., engine load level or notch level) is at a full engine power level. The engine power level may be full if the engine is operating at a highest power output or if the engine power level is greater than a threshold power level. Additionally or alternatively, the engine power level may correspond to a throttle position, wherein a fully open throttle position may indicate the engine power level being full. Additionally or alternatively, the method may further include determining if a boost demand is met. Boost demand may be met if a compressor speed matches a value associated with a specific compressor speed according to a compressor map, as an example. In yet another example, the engine power level may be at a full (e.g., highest) level when a notch level of the engine (such as a locomotive engine) is at a highest available notch level.

If the engine power level is at the full power level, then the method 500 may proceed to 508, which may include determining if a pre-turbine temperature is less than a threshold temperature. The pre-turbine temperature may be estimated based on feedback from a temperature sensor arranged upstream of the turbine and downstream of the engine so that exhaust gas from the engine reaches the temperature sensor before the turbine. The temperature sensor may provide an indication of exhaust gas temperatures flowing to the turbine, which may be extrapolated via data stored in a look-up table to estimate the turbine temperature. The threshold temperature may be substantially equal to a turbine temperature where degradation may occur. As such, the turbine may be too hot or get too hot if the pre-turbine temperature is greater than the threshold temperature. If the pre-turbine temperature is less than the threshold temperature, then the method 500 may proceed to 510, which may include maintaining current engine operating parameters. In one example, this may further include not operating the turbine with variable geometry. As such, the flow control system blocks air from flowing to the vanes (e.g., from flowing to the air ports of the nozzle vanes) at 512. In this way, a boundary layer of air does not form in the turbine nozzle, between the nozzle vanes.

If the engine power level is less than the full level or if the engine power level is equal to the full level but the pre-turbine temperature is greater than or equal to the threshold temperature, then the method 500 may proceed to 514, which may include flowing air from the air source to the vanes to form a boundary layer of air at 516. This may include adjusting one or more valves of the flow control system to at least partially open positions. As described above, the flow source may be a compressor or charge-air cooler. Additionally or alternatively, high pressure air may be retrieved from some other device, such as a pump or deactivated cylinder. In some examples, multiple air sources may be used to flow air to the vanes. For example, each of the charge-air cooler and compressor may be used to provide a mixture of uncooled and cooled compressed air to the vanes. Additionally or alternatively, only one of the compressor and the charge-air cooler may provide air to the vanes at a given moment.

An amount of air flowing to the vanes may be based on a variety of factors including engine power level and pre-turbine temperature. In one example, more air may flow to the vanes if the engine power level is a lower power level. Additionally or alternatively, more air may flow to the vanes as a difference between the pre-turbine temperature and the threshold temperature increases. As such, less air may flow to the vanes as the engine power level increases or as the difference between the pre-turbine temperature and the threshold temperature decreases.

In some examples, the pre-turbine temperature may be greater than the threshold temperature during higher engine power levels, such as a full engine power level. In such an example, a portion of exhaust gas may bypass the turbine to avoid surge. In this way, the boundary layer formed when the pre-turbine temperatures are too high may be compensated for by bypassing exhaust gas around the turbine, via a wastegate or other similar device.

As described above, the valves of the flow control system may be configured to actuate to a fully open position, a fully closed position, or a position therebetween. The fully open position allows 100% air flow and the fully closed position blocks air flow (e.g., allows 0% air flow). Thus, positions of the valve between fully opened and fully closed may allow between 0 and 100% air flow. This may provide a greater control over the effective throat area created in the turbine, allow the controller to more finely tune an amount of boost provided.

The method 500 may proceed to 518, which may include determining if the turbine area is not changing. If the turbine area is not changing, then the method 500 may proceed to 520 to stop flowing air to the vanes and to activate an indicator lamp at 522. The indicator lamp may alert an operator that degradation to the turbine has occurred. The degradation may include a valve or other element of the flow control system being stuck and/or injection ports or other openings of the vanes being clogged. If the turbine area is changing, then air is flowing through the vanes and forming a boundary layer and the method 500 may proceed to 524 to determine if the engine power level is decreasing. The method may additionally include determining if the difference between the pre-turbine temperature and the threshold temperature is increasing. If the engine power level is decreasing or if the difference is increasing, then the method 500 may proceed to 526 to flow more air from the air source to the vanes to increase the boundary layer size and/or to increase cooling. If the boundary layer size is increased, then more boost may be generated with a smaller volume of exhaust gas. Additionally, the turbine may be cooled as more air flows from the vanes into the turbine nozzle.

If the engine power level is not decreasing or if the difference is not increasing, then the method 500 may proceed to 528 to determine if the engine power level is increasing or if the difference is decreasing. If the engine power level is increasing or if the difference is decreasing, then the method 500 may proceed to 530 to flow less air from the air source to the vanes. This may decrease the boundary layer size and decrease cooling provided by the vanes.

If the engine power level is not increasing or if the difference is not decreasing, then the method 500 may proceed to 532 where the engine power level is constant. The method 500 may proceed to 534 to maintain the current air flow to the vanes so that the boundary layer and cooling do not change.

Turning now to FIG. 6, it shows an engine operating sequence 600 illustrating one or more operating conditions of an engine (e.g., engine 104 of FIG. 1) executing a method for adjusting an effective throat area of a turbine (e.g., method 500 of FIG. 5). Plot 610 illustrates an engine power level, which may be similar to an engine load and/or notch level of the engine. Plot 620 illustrates a current boost provided by the turbocharger and plot 622, shown in dashed lines, illustrates a boost demand. During some instances, plot 622 may track plot 620 and as such, the two plots may overlap, thereby illustrating an equivalence between the two plots. Plot 630 illustrates a number of valves of the flow control system (e.g., flow control system 430 shown in FIG. 4) in an at least partially open position. Thus, plot 630 corresponds to an amount of airflow provided to the nozzle vanes (e.g., more airflow is provided as a larger number of valves are opened). However, in alternate embodiments, a different type of flow control system may be used to adjust (e.g., continuously adjust based on engine operating conditions), an amount of airflow provided to the nozzle vanes. Plot 640 illustrates an effective throat area of the turbine. Time increases from a left to right side of the figure.

Prior to t1, the engine power level is relatively high (plot 610). For example, the engine power level prior to time t1 may represent a full load condition. Boost demand is also relatively high (plot 622). Current boost (plot 620) is equal to the boost demand without adjusting the effective throat area (plot 640) of the turbine. As such, exhaust gas production prior to t1 is sufficient to meet the boost demand without opening valves of the flow control system. Further, the nozzle ring including the nozzle vanes may be optimized for full load operation (e.g., the vanes may be positioned on the nozzle vane for increased efficiency at full load operation when airflow through the turbine is relatively high). As such, zero vales are open (plot 630). At t1, the engine load begins to decrease.

Between t1 and t2, the engine power level continues to decrease. The boost demand also decreases. However, the efficiency of the turbine at the current, lower level of exhaust gas production may be reduced and may not be able to meet the boost demand, and as a result, the current boost falls below the boost demand. At t2, one valve of the flow control system is moved to an at least partially open position. In the example of FIG. 6, the one valve is moved to a fully open position.

Between t2 and t3, air may flow through inlets of the vanes corresponding to the opened valve. As such, injection ports fluidly coupled to the inlets receiving air may begin to flow air adjacent the turbine nozzle and form a boundary layer of air. The boundary layer of air may decrease the effective throat area of the turbine, resulting in an amplification of the boost provided by a current level of exhaust gas production. As such, the current boost increases toward the boost demand. However, the current boost still remains below the boost demand. At t3, a second valve is opened such that two valves are in open positions. The second valve may be opened in response to the engine power level continuing to decrease.

Between t3 and t4, air may flow through inlets of the vanes corresponding to the two opened valves including a first valve and a second valve. As such, injection ports fluidly coupled to the inlets receiving air may flow air adjacent to the turbine nozzle and increase a size of the boundary layer of air. As the size of the boundary layer of air increases, the effective throat area of the turbine decreases, thereby accelerating exhaust gas flowing toward a turbine blade and increasing boost. The current boost increases toward and equals the boost demand. At t4, the engine power level remains constant.

Between t4 and t5, the engine power level begins to increase, thereby increasing the boost demand and the current boost. However, as the engine power level increases, the exhaust gas produced may also increase, thereby resulting in less demand for the effect of the exhaust gas to be amplified by a reduced effective throat area. As such, the number of valves open decreases from two to one and the effective throat area increases to prevent too much boost production. At t5, the engine power level continues to increase.

After t5, the engine power level continues to increase and exhaust gas production reaches an amount where the boundary layer of air is no longer needed. As such, the remaining valve is moved to a closed position. The boundary layer of air is disrupted and the effective throat area of the turbine increases to a full area.

Turning now to FIGS. 7A and 7B, they show first and second examples 700 and 750, respectively, of differently sized boundary layers of air formed by flowing air through and out of stationary vanes of a turbine nozzle (such as the vanes shown in FIGS. 2 and/or 3). More specifically, the first example shows a smaller boundary layer and the second example shows a larger boundary layer. Each of the examples comprises a first vane 702 directing air 722 toward a second vane 704. The air may flow from injection ports 706 of the first vane to the second vane, where a flow direction of the air is angled to a plane of the second vane and perpendicular to a plane of the first vane. The air may form a boundary layer, wherein an outer boundary of the boundary layer is shown via dashed line 708. Double headed arrow 712 illustrates a distance between the boundary layer and the second vane of the first example. Double headed arrow 714 illustrates a distance between the boundary layer and the second vane of the second example. As shown, the distance between the second vane and the boundary layer in the first example is greater than the distance between the second vane and the boundary layer in the second example. More specifically, the double headed arrow is bigger than the double headed arrow due to less air flowing in the first example compared to the second example. As a result, exhaust gas 724 flowing through the space between the second vane and the boundary layer in the first example may accelerate less than exhaust gas flowing through the space between the second vane and the boundary layer in the second example. As such, the second example may provide more boost than the first example with an equal volume of exhaust gas. In this way, the geometry of the turbine nozzle may be adjusted via vane airflow alone and not by mechanically adjusting a position of the vanes.

Turning now to FIG. 8A, it shows an embodiment 800 of a plurality of vanes 810. The plurality of vanes 810 may be similar to the plurality of vanes 210 of FIG. 2A, and thus may be coupled to a nozzle ring of a turbine, be paddle- or tear drop-shaped, be stationary, etc. The plurality of vanes 810 may comprise a plurality of inlets 812 configured to direct gas, such as air, to a plurality of injection ports 814. The plurality of injection ports 814 may be configured to adjust an effective throat area of the turbine based on at least an engine power level and exhaust gas production.

The plurality of injection ports 814 may include an injection port 816, and the remaining injection ports of the plurality of injection ports 814 may be substantially identical to the injection port 816. The injection port 816 may be a single opening, extending in a direction perpendicular to a central axis 899 of a first vane 815 of the plurality of vanes 810. The injection port 816 may be a slot or other type of opening that is relatively long (e.g., in width) and narrow (e.g., in height). In an example, the injection port may comprise a rectangular shape. As such, corners of the injection port 816 may be 90°. Additionally or alternatively, the injection port 816 may comprise curved and/or rounded corners, which may enhance air flow therethrough. The injection port 816 has a width that extends perpendicular to the central axis 899 and has a height that extends parallel to the central axis 899. The width of the injection port 816 is greater than the height of the injection port 816. In a non-limiting example, the width may be at least twice the height. In another non-limiting example, the width may be at least five times the height. The injection port 816 may extend across a majority of an outer surface 803 of each vane of the plurality of vanes 810, such as extending across at least 75% of a width of the outer surface. More specifically, the injection port extends from a first side 804, where the plurality of inlets 812 are arranged, to a second side 805.

Each injection port, such as the injection port 816, may receive air from one of the plurality of inlets 812. In this way, each injection port is fluidly coupled to only one inlet of the plurality of inlets. Additionally or alternatively, in one example, each inlet of the plurality of inlets 812 is fluidly coupled to only one injection port of the plurality of injection ports 814. In one embodiment, each inlet may be individually controlled via a valve or other mechanism such that air flow through each injection port may be more finely controlled. In such an example, the effective throat area may be fine-tuned to a precise throat area. The slot shape of the plurality of injection ports 814 may provide more uniform airflow than the circular injection ports 314 of FIG. 3. That is to say, breaks and/or interruptions, which may be experienced between the injection ports 314 may be avoided with the injection ports 814.

Additionally or alternatively, in one example, air flow through the plurality of inlets 812 for a single vane may be controlled independently relative to other vanes of the plurality of vanes 810. However, air flow to the single vane may be distributed to each of the plurality of inlets 812 without control of air flow through individual inlets of the plurality of inlets 812 of the single vane. As such, if a vane is receiving air, then its inlets may be flowing relatively equal amount of air to each of the injection ports associated with the vane. By doing this, a cost of manufacture of the turbine nozzle may be reduced.

More specifically, a plurality of valves 802 may be configured to adjust air flow to each of the plurality of injection ports 814. Positions of the plurality of valves 802 may be adjusted in response to a signal sent from a controller (e.g., controller 110 of FIG. 1). In one example, the controller may send different signals to actuators of the plurality of valves 802 such that at least two of the plurality of valves 802 are in different positions, thereby allowing different air flows through corresponding injection ports to allow a more fine-tuned nozzle throat area.

In one example, a first valve 802A of the plurality of valves 802 adjusts airflow to only a first row 820A of the plurality of injection ports 814. Thus, a second valve 802B may adjust air flow to only a second row 820B of the plurality of injection ports 814. A third valve 802C may adjust air flow to only a third row 820C. A fourth valve 802D may adjust air flow to only a fourth row 820D of the plurality of injection ports 814. As illustrated in the embodiment of FIG. 8A, each row comprises a single injection port with a rectangular-shape extending from the first longitudinal side 804 to the second longitudinal side 805 of the first vane 815 in a direction perpendicular to the central axis 899. In some embodiments, each row may comprise a different number of injection ports, wherein some rows may comprise a mix of differently shaped injection ports. By adjusting a number and shape of injection ports arranged within a single row, the nozzle throat area may be more finely controlled.

Each injection port of the plurality of injection ports 814 may be spaced apart from a neighboring injection port by a suitable amount. For example, a space 822 between the first row 820A and the second row 820B may have a height (extending in a direction parallel to the central axis) that is at least as high as the height of the injection port 816. In a non-limiting example, the space 822 may have a height that is twice as high as the height of the injector port. Each space between neighboring rows may be the same height, or different spaces may have different heights.

The plurality of injection ports shown in FIG. 8A may include injection ports that are consistent in size and shape as the ports extend across the outer surface of the vane body. Further, the outer surface surrounding each injection port may be substantially smooth and/or flat. This configuration may result in air being injected across each respective port in an equal manner (e.g., equal in pressure or flow rate) and/or air being injected in a relatively straight direction. However, other configurations are possible without departing from the scope of this disclosure. For example, the injection ports may be configured with one or more air-directing devices that may act to preferentially direct the air up, down, or to one side. As an example, one or more injection ports may include a louver-like covering that extends over a top or bottom of the injection port. In another example, additionally or alternatively, one or more injection ports may change in height as the injection port extends across the outer surface of the vane body. For example, an injection port may have a first height at a first side of the injection port (e.g., adjacent to its corresponding inlet), and a second height at a second side of the injection port, with the height gradually increasing or decreasing from the first height to the second height across the injection port.

In this way, by configuring the injection ports as slots rather than circular holes, a larger amount of air may be injected. By including a single, long slot rather than a row of smaller injection holes, the complexity of each vane may be reduced by including only one supply line per slot rather than two, four, or more supply lines per row of injection holes.

Turning now to FIG. 8B, it shows an embodiment 820 of a plurality of vanes 830. The embodiment 820 may differ from the embodiment 800 in that it comprises a plurality of first injection ports 832 identical to the plurality of injection ports 814 of FIG. 8A and a second plurality of injection ports 834 identical to the plurality of injection ports 314 of FIG. 3. As such, each vane of the plurality of vanes 830 may comprise differently shaped injection ports, wherein the first plurality of injection ports 832 comprise a rectangular shape and the second plurality of injection ports 834 comprise a circular shape. The first and second plurality of injection ports 832, 834 may alternate with one another along the central axis 899 of a vane of the plurality of vanes 830, relative to a plurality of inlets 836. That is to say, a first inlet of the plurality of inlets is fluidly coupled to only a first injection port of the plurality of first injection ports 832, wherein a second inlet, subsequent the first inlet, is fluidly coupled to only a second injection port of the plurality of second injection ports 834. By doing this, injection ports of an identical shape are separated via an injection port with a different shape. Additionally or alternatively, the injection ports may not alternate along the central axis 899.

In one embodiment, additionally or alternatively, the plurality of first and second injection ports may be fluidly coupled to a single inlet of the plurality of inlets. In this way, if the single inlet is fluidly coupled to a row of injection ports extending in a direction perpendicular to the central axis, then the row may comprise at least two different shapes for the injection ports including the slot and/or rectangular shape and the circular shape. The injection port shapes may alternate along the row such that injection ports with the same shape may be separated by an injection port with a different shape. It will be appreciated that shapes other than rectangular and circular may be used. Other example shape may include triangles, trapezoids, squares, diamonds, ellipses, pentagons, hexagons, stars with varying numbers of points, other polygonal shapes, and the like.

More specifically, a first vane 835 of the plurality of vanes 830 may comprise a first row 840A comprising an injection port of the plurality of first injection ports 832. The first vane 835 further comprises a second row 840B, adjacent to the first row 840A, comprising a plurality of injection ports of the plurality of second injection ports 834. The first vane 835 further comprises a third row 840C, adjacent to the second row 840B, comprising an injection port of the plurality of first injection ports 832. The first vane 835 further comprises a fourth row 840D, adjacent to the third row 840C, comprising a plurality of injection ports of the plurality of second injection ports 834. Each vane of the plurality of vanes 830 may be substantially identical to the first vane 835. Additionally or alternatively, in the example of FIG. 8B, a second vane 837 of the plurality of vanes 830 is different than the first vane 835. The second vane 837 comprises a first row 841A, a second row 841B, a third row 841C, and a fourth row 841D. Each of the first, second, third, and fourth rows 841A-D comprise different numbers and arrangements of the plurality of first injection ports 832 and second injection ports 834. For example, the first row 841A comprises one of the plurality of first injection ports 832 adjacent to a first longitudinal side 823 and a plurality of the second injection ports 834 adjacent to a second longitudinal side 824. In this way, injection ports of multiple types (e.g., shapes and sizes) may be intermixed along a single row. By doing this, benefits of the slot-shaped (e.g., rectangle-shaped) injection ports and the circle-shaped injection ports may be realized.

In one example, air flow to the plurality of first injection ports 832 may be independently controlled relative to air flow to the plurality of second injection ports 834. In one example, a valve may control air flow to adjacent injection ports of the plurality of first and second injection ports 832, 834. In such an example, the adjacent injection ports may constitute a set of injection ports, wherein a single valve adjusts air flow to the set of injection ports.

Turning now to FIG. 8C, it shows an embodiment 850 of a plurality of vanes 860 comprising a first vane 865 and a second vane 867. The first vane 865 and the second vane 867 are different from one another in the example of FIG. 8C. However, it will be appreciated that the first vane 865 and the second vane 867 may be identical in other examples. Additionally or alternatively, the plurality of vanes 860 may comprise vanes in addition to the first and second vanes, wherein other vanes of the plurality of vanes 860 may be identical to the first vane 865 or the second vane 867.

The first vane 865 comprise a first plurality of injection ports 862 and a second plurality of injection ports 864. The first plurality of injection ports 862 may be arranged along a first row 870A and a third row 870C. The second plurality of injection ports 864 may be arranged along a second row 870B and a fourth row 870D. The first row 870A, the second row 870B, the third row 870C, and the fourth row 870D may receive air from different inlets of a plurality of inlets 866 arranged on a long side 865A of the first vane 865. The first and second pluralities of injection ports 862 and 864 are arranged on an outer surface 865B which extends from the long side 865A, which is a first long side 865A, to a second long side opposite the first. The first plurality of injection ports 862 may include slot-shaped ports shaped similarly to the slot-shaped ports of FIGS. 8A and 8B. However, in the example of FIG. 8C, the first plurality of injection ports 862 are angled less than or greater than 90° such that slot-shaped injection ports of separate rows are angled to or away from one another. Said another way, the first plurality of injection ports 862 are not parallel to one another. As illustrated, the first row 870A comprises only one slot-shaped injection port and the third row 870C comprises only one slot-shaped injection port. The slot-shaped injection ports extend toward one another at first extreme ends while extending away from one another at second extreme ends. The second plurality of injection ports 864 arranged in the second row 870B are arranged proximally to the second extreme ends of the slot-shaped injection ports.

As illustrated, the second plurality of injection ports 864 may comprise a plurality of shapes include a circle 864A, a triangle 864B, a pentagon 864C, a chevron 864D, a trapezoid 864E, a diamond 864F, a star 864G, a donut 864H, and a plus 864I. The second plurality of injection ports 864 may comprise any number of the different plurality of shapes such that more than one of each of the shapes may be arranged within a single row or across the plurality of rows.

Along the second row 870B and the fourth row 870D, the second plurality of injection ports 864 are arranged along separate axes within a single row, such that the second plurality of injection ports 864 arranged within the second row 870B are not aligned along a single axis. Similarly, the second plurality of injection ports 864 arranged along the fourth row 870D are not aligned along a single axis.

The second vane 867 comprises a different arrangement of the first plurality of injection ports 862 and the second plurality of injection ports 864. For example, the first row 871A of the second vane 867 comprises a combination of a slot-shaped injection port of the first plurality of injection ports 862 and circle shaped injection ports 864A and the star-shaped injection port 864G of the second plurality of injection ports. The second row 871B of the second vane 867 comprises a slot-shaped injection port of the first plurality of injection ports 862 and circle-shaped injection ports 864A and a donut-shaped injection port 864H of the second plurality of injection ports 864. The slot injection port arranged along the second row is oriented in a direction parallel to the slot injection port arranged along the first row, while each are angled at an angle different than 90 degrees relative to the central axis 899. The third row 871C comprises only a single slot injection port oriented exactly perpendicular to the central axis 899. The fourth row 871D comprises only circle shaped injection ports and a plus-shaped injection port 864I of the second plurality of injection ports 864.

In one example, the embodiment of FIG. 8C illustrates vanes of a turbine which may comprise a plurality of injection ports configured to flow air to create a boundary layer of air in a turbine throat to adjust an effective area of the throat. The plurality of injection ports may comprise a plurality of different shapes and orientations to achieve a wide-range of effective areas so that desired turbine operating parameters may be realized despite insufficient exhaust gas production.

In this way, a turbine geometry may be adjusted via a flow control system arranged outside of (e.g., exterior to a housing of) the turbine, wherein the flow control system may adjust an amount and/or flow rate of air flow supplied to a plurality of vanes arranged on a nozzle ring in the turbine and out of injection ports of the plurality of vanes. As the vanes inject more air into the nozzle ring, the throat area of the nozzle decreases, thereby changing the geometry of the turbine. By adjusting the geometry of the turbine without moving parts arranged therein, repairs and maintenance of the turbine and the vanes may be simpler and less costly. Additionally, manufacture of the turbine may be less expensive than comparable turbines with moving shrouds and/or vanes. The technical effect of maintaining the vanes stationary and adjust the throat area of the turbine nozzle via airflow from the vanes is to decrease a difficulty of fabricating the turbine while providing a greater degree of turbine geometry control via the external flow control system.

As one embodiment, a system for an engine of a locomotive, comprises a turbocharger turbine including a nozzle ring, the nozzle ring including a plurality of stationary vanes, each vane of the plurality of stationary vanes including a plurality of injection ports arranged at an outer surface of the vane and a gas supply system to supply variable gas flow to and out of the plurality of injection ports. A first example of the system further includes where the gas supply system is adapted to supply the variable gas flow based on an operating condition of the engine. A second example of the system, optionally including the first example, further includes where the gas supply system includes an electronically controlled valve system fluidly coupled with the plurality of injection ports and adapted to adjust an amount of air supplied via the plurality of injection ports based on the operating condition of the engine. A third example of the system, optionally including the first and/or second examples, further includes where the operating condition is an engine power level. A fourth example of the system, optionally including one or more of the first through third examples, further includes where the plurality of injection ports is divided into groups including at least a first group of injection ports and a second group of injection ports. A fifth example of the system, optionally including one or more of the first through fourth examples, further includes where the gas supply system comprises a first valve configured to adjust air flow to the first group of injection ports and a second valve configured to adjust air flow to the second group of injection ports. A sixth example of the system, optionally including one or more of the first through fifth examples, further includes where a central axis of a first stationary vane of the plurality of stationary vanes, the central axis defining a long axis of the first stationary vane, is angled relative to central axes of stationary vanes arranged adjacent to the stationary vane on the nozzle ring. A seventh example of the system, optionally including one or more of the first through sixth examples, further includes where the stationary vanes are fixed and immovable.

As another embodiment, a method for an engine of a locomotive, comprises adjusting an amount of air injected from a plurality of injection ports arranged on an outer surface of a vane of a turbine nozzle ring of a turbine to adjust a boundary layer on the outer surface and a throat opening of the nozzle ring based on an operating parameter of the engine. A first example of the method further includes adjusting the amount of air is performed while maintaining the vane stationary on the turbine nozzle ring. A second example of the method, optionally including the first example, further includes where the operating parameter is an engine power level, and further comprising, as the engine power level decreases, progressively increasing the amount of air injected by increasing a number of injection ports of the plurality of air ports that are injecting air. A third example of the method, optionally including the first and/or second examples, further includes where progressively increasing the amount of air injected includes increasing a number of rows of the plurality of injection ports that inject air. A fourth example of the method, optionally including one or more of the first through third examples, further includes where adjusting the amount of air injected further includes actuating a valve system arranged outside of the turbine, which comprises the turbine nozzle ring, to allow air to flow from a compressor to the vane, and increasing a number of open valves of the valve system to increase the amount of air injected, where the compressor is rotationally driven by the turbine. A fifth example of the method, optionally including one or more of the first through fourth examples, further includes where the valve system comprises a series of valves, and where a first valve of the series of valves adjusts air flow through a first row of injection ports of the vane, and where a second valve of the series of valves adjusts air flow through a second row of injection ports of the vane. A sixth example of the method, optionally including one or more of the first through fifth examples, further includes where adjusting the amount of air injected includes increasing the amount of air injected to increase the boundary layer and decrease the throat opening of the nozzle ring in response to decreasing engine load and/or increasing pre-turbine temperature and wherein adjusting the amount of air injected includes decreasing the amount of air injected to decrease the boundary layer and increase the throat opening of the nozzle ring in response to increasing engine load and/or decreasing pre-turbine temperature.

As yet another embodiment, a system for an engine of a locomotive comprises a turbocharger including a compressor driven by a turbine, the turbine including a nozzle ring with a plurality of stationary vanes mounted thereon, each vane of the plurality of stationary vanes including multiple rows of air passages within the vane, where each air passage terminates at at least one injection port arranged on an outer surface of the vane, an air flow control system fluidly coupled to the compressor and the multiple rows of air passages of each vane, and a controller including computer-readable instructions stored on memory that when executed during operation of the engine cause the controller to actuate the air flow control system to adjust, for each vane, a number of rows of the multiple rows of air passages receiving air from the compressor via the air flow control system as an engine power level of the engine changes. A first example of the system further includes where instructions further cause the controller to actuate the air flow control system to block air flow from the compressor to the air passages when the engine power level is greater than a threshold power level. A second example of the system, optionally including the first example, further includes where the at least one injection port is a plurality of injection ports, and where each air passage is fluidly coupled to the plurality of injection ports and wherein adjacent air passages of the multiple rows of air passages are fluidly separated from one another. A third example of the system, optionally including the first and/or second examples, further includes where the instructions further cause the controller to increase the number of rows of the multiple rows of air passages receiving air from the compressor via the air flow control system in response to a gas temperature upstream of the turbine increasing above threshold temperature. A fourth example of the system, optionally including one or more of the first through third examples, further includes where the air flow control system includes a valve system, the valve system comprising a valve for each air passage of the vane, and where only valves of the valve system move to adjust air flow through the air passages.

In an embodiment, a system for an engine includes a turbocharger turbine having a nozzle ring. The nozzle ring includes a plurality of stationary vanes. One or more of the plurality of stationary vanes includes one or more injection ports arranged at outer surfaces of the one or vanes. The system also includes a gas supply system configured to supply variable gas flow to and out of the one or more injection ports via one or more passages through the one or more of the plurality of the stationary vanes, e.g., the passages extend through the vane and terminate at the outer surfaces of the vanes, as the injection ports. According to various aspects, the one or more injection ports on the surface(s) of the one or more vanes may include: one vane has one injection port; plural vanes each have a respective one injection port; one vane has plural injection ports; or plural vanes each have plural respective injection ports. In one embodiment, at least two of (i.e., two or more of) the vanes each have plural respective injection ports. In all such embodiments, there may also be vanes that do not have any injection ports. In another embodiment, all the vanes of the turbine have one or more respective injection ports, and in another embodiment, all the vanes have respective plural injection ports.

As mentioned, nozzle rings with the vanes attached thereto (and/or the vanes individually), including the injection ports and internal passages, may be manufactured using an additive manufacturing process, e.g., a 3-D printer. One example is a metal binder jet printer where metal powder is deposited in successive layers according to the configuration of the final part, with the successive layers bonded to one another with a liquid binding agent. Other examples include direct metal laser sintering (DMLS) and direct metal laser melting (DMLM), where, e.g., lasers are used to melt successive, thin (e.g., 20-60 micron) layers of metal powder on top of one another. Other processing steps may include sintering, annealing, curing, chemical cleaning and other processing, coating, polishing, etc.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, the system comprising:
at least one cylinder;
a turbocharger turbine receiving exhaust gas from the at least one cylinder through an exhaust passage fluidly coupled to the at least one cylinder and the turbocharger turbine, wherein the turbocharger turbine includes a nozzle ring, the nozzle ring including a plurality of stationary vanes, each stationary vane of the plurality of stationary vanes including an outer surface, and each stationary vane of one or more stationary vanes of the plurality of stationary vanes including a plurality of rows each comprising at least one injection port arranged at the outer surface of the stationary vane; and
a gas supply system comprising a valve system fluidly coupled with the at least one injection port is configured to supply variable gas flow to and out of the at least one injection port of each of the plurality of rows.

2. The system of claim 1, wherein each stationary vane of the plurality of stationary vanes includes a plurality of injection ports arranged at the outer surface of the stationary vane, wherein the plurality of injection ports has at least one shape including one or more of a slot shape, a rectangle shape, a square shape, a diamond shape, a trapezoid shape, a star shape, a triangular shape, a pentagon shape, a hexagon shape, a plus shape, another polygon shape, a circular shape, an elliptical shape, and a donut shape.

3. The system of claim 2, wherein the at least one shape of the plurality of injection ports includes one or more of the circular shape and the slot shape.

4. The system of claim 2, wherein the plurality of injection ports is divided into a plurality of groups comprising a first group of injection ports and a second group of injection ports, wherein the first group of injection ports comprises at least one injection port having the slot shape, wherein the second group of injection ports comprises at least one injection port having the circular shape, and wherein the at least one injection port having the slot shape comprises a height smaller than its width and extends across at least 75% of a width of the outer surface of the stationary vane.

5. A method for an engine, the method comprising:
at a controller, commanding an adjustment of an amount of air injected from at least one injection port arranged on an outer surface of a vane of a turbine nozzle ring of a turbine to adjust a boundary layer on the outer surface and a throat opening of the turbine nozzle ring, wherein the turbine receives exhaust gas from at least one cylinder in the engine and is fluidly coupled to the at least one cylinder via an exhaust passage.

6. The method of claim 5, wherein the at least one injection port has at least one shape including one or more of a slot shape, a rectangle shape, a square shape, a diamond shape, a trapezoid shape, a star shape, a triangular shape, a pentagon shape, a hexagon shape, a plus shape, another polygon shape, a circular shape, an elliptical shape, and a donut shape.

7. The method of claim 5, wherein the vane is included in a plurality of vanes of the turbine nozzle ring, wherein the at least one injection port is included in a plurality of injection ports, the plurality of injection ports arranged on outer surfaces of the plurality of vanes, and wherein commanding the adjustment of the amount of air includes commanding an adjustment of amounts of air injected from the plurality of injection ports.

8. The method of claim 7, wherein commanding the adjustment of the amount of air injected further includes commanding actuation of a valve system comprising a plurality of valves arranged outside of the turbine, wherein a first set of valves of the plurality of valves adjusts an amount of air injected through only slot-shaped injection ports of the plurality of injection ports, and wherein a second set of valves of the plurality of valves adjusts an amount of air injected through only circular-shaped injection ports of the plurality of injection ports, wherein the slot-shaped injection ports comprise curved corners or corners angled 90 degrees.

9. The method of claim 7, wherein commanding the adjustment of the amount of air is performed while maintaining the plurality of vanes stationary on the turbine nozzle ring, wherein the adjustment comprises:
adjusting a position of a first valve configured to adjust air flow to only a first group of injection ports of the plurality of injection ports; and
adjusting a position of a second valve configured to adjust air flow to only a second group of injection ports of the plurality of injection ports.

10. The method of claim 9, further comprising, at the controller, responsive to an engine power level decreasing, commanding progressive increases of the amount of air injected by increasing a number of injection ports of the plurality of injection ports that are injecting air, wherein increasing the number of injection ports includes adjusting the second valve to a more open position following adjusting the first valve to a fully open position.

11. The method of claim 10, wherein commanding the progressive increases of the amount of air injected includes commanding increases to a number of rows and/or slots of the plurality of injection ports that are injecting air.

12. The method of claim 7, wherein commanding the adjustment of the amount of air injected from the plurality of injection ports includes actuating a valve system comprising a plurality of valves arranged outside of the turbine, wherein a first set of valves of the plurality of valves adjust an amount of air injected through only slot-shaped injection ports of the plurality of injection ports, and wherein a second set of valves of the plurality of valves adjust an amount of air injected through only circular-shaped injection ports of the plurality of injection ports, wherein the slot-shaped injection ports comprise curved corners or corners angled 90 degrees.

13. The method of claim 12, wherein commanding the adjustment of the amount of air injected from the plurality of injection ports includes commanding flowing of air through only one slot-shaped injection port along a single row of the plurality of injection ports, wherein the single row extends in a direction perpendicular to a vane central axis.

14. The method of claim 13, wherein commanding the adjustment of the amount of air injected from the plurality of injection ports further includes commanding flowing of air through a plurality of circular-shaped injection ports arranged along the single row of the plurality of injection ports.

15. A system for an engine, the system comprising:
a turbocharger including a compressor driven by a turbine, the turbine including a nozzle ring with a plurality of stationary vanes mounted thereon, each stationary vane of the plurality of stationary vanes including multiple rows of air passages within the stationary vane, wherein each air passage of the multiple rows of air passages terminates at at least one injection port arranged on an outer surface of the stationary vane;
an air flow control system comprising a valve system fluidly coupled to the compressor and the multiple rows of air passages of each stationary vane of the plurality of stationary vanes; and
a controller including computer-readable instructions stored on memory that when executed during operation of the engine cause the controller to:
actuate the air flow control system to adjust, for each stationary vane of the plurality of stationary vanes, a number of rows of the multiple rows of air passages receiving air from the compressor via the air flow control system as an operating condition of the engine changes.

16. The system of claim 15, wherein the at least one injection port comprises a plurality of injection ports, and the plurality of injection ports has at least one shape including one or more of a slot shape, a rectangle shape, a square shape, a diamond shape, a trapezoid shape, a star shape, a triangular shape, a pentagon shape, a hexagon shape, a plus shape, another polygon shape, a circular shape, an elliptical shape, and a donut shape.

17. The system of claim 15, wherein a first row of the multiple rows of air passages comprises at least one slot-shaped injection port at which at least one air passage of the first row respectively terminates and a second row of the multiple rows of air passages comprises a plurality of circular-shaped injection ports at which a plurality of air passages of the second row respectively terminates.

18. The system of claim 17, wherein the first row only comprises only one slot-shaped injection port and the second row comprises only the plurality of circular-shaped injection ports.

19. The system of claim 17, wherein the first row is a row of a plurality of first rows and the second row is a row of a plurality of second rows, wherein the plurality of first and second rows alternate along a central axis of the stationary vane, wherein each second row of the plurality of second rows separates adjacent first rows of the plurality of first rows, and wherein adjacent air passages of the multiple rows of air passages are fluidly separated from one another.

20. The system of claim 17, wherein the first row further comprises at least one circular-shaped injection port, and wherein the first row comprises a plurality of slot-shaped and circular-shaped injection ports alternating with one another along the first row.

* * * * *